United States Patent [19]

Taylor

[11] Patent Number: 5,443,151
[45] Date of Patent: Aug. 22, 1995

[54] CONVEYOR OR CRANE BEAM OF EXTRUDED ALUMINUM ALLOY

[75] Inventor: Michael K. Taylor, Farmington, N.Y.

[73] Assignee: Gorbel, Inc., Fishers, N.Y.

[21] Appl. No.: 219,949

[22] Filed: Mar. 30, 1994

[51] Int. Cl.6 ............................................. B65G 21/02
[52] U.S. Cl. ................... 198/860.1; 104/109
[58] Field of Search ............ 198/678.1, 685, 686, 198/860.1, 860.2; 104/94, 106, 107, 108, 109

[56] References Cited

U.S. PATENT DOCUMENTS

| D. 289,983 | 5/1987 | Mino et al. |  |
|---|---|---|---|
| 978,581 | 12/1910 | Hamilton . |  |
| 3,064,585 | 11/1962 | Ewing, Jr. | 104/109 X |
| 3,217,659 | 11/1965 | Ford, Jr. | 104/109 |
| 3,687,367 | 8/1972 | Schurch et al. | 104/106 X |
| 3,987,877 | 10/1976 | Bulanchuk . |  |
| 4,524,698 | 6/1985 | Tourtellier et al. | 104/94 X |
| 4,576,096 | 3/1986 | Toder . |  |
| 4,768,442 | 9/1988 | Miller . |  |
| 4,838,412 | 6/1989 | Backman . |  |
| 5,181,296 | 1/1993 | Williams . |  |

FOREIGN PATENT DOCUMENTS

| 367238 | 5/1990 | European Pat. Off. . |  |
|---|---|---|---|
| 1576944 | 6/1969 | France . |  |
| 0516773 | 6/1976 | U.S.S.R. | 104/107 |
| 0626020 | 8/1978 | U.S.S.R. | 104/106 |

Primary Examiner—James R. Bidwell
Attorney, Agent, or Firm—Eugene Stephens & Associates

[57] ABSTRACT

A beam for a bridge crane or conveyor system is extruded from an aluminum alloy in a configuration that disposes thickened regions at four corners of the beam. One pair of these is along opposite edges of a top flange, and another pair is at opposite lower corners of a bottom channel. The thickened regions are formed with alignment pin dowel grooves that can receive dowel pins for aligning butt joints between beams. The thickened regions also contribute to the strength-to-weight ratio of the beam.

19 Claims, 2 Drawing Sheets

CONVEYOR OR CRANE BEAM OF EXTRUDED ALUMINUM ALLOY

TECHNICAL FIELD

This invention occurs in the art of extruded aluminum alloy beams for bridge cranes and conveyors.

BACKGROUND

Bridge cranes and conveyor systems use overhead track or runway beams and movable bridge beams formed of steel or aluminum alloy materials in various configurations. Many of these include channels that provide wheel tracks for wheeled elements such as trolleys and end trucks that support loads for movement along the length of the beams. Strength is an important consideration in configuring such beams, but so is cost of material and ease of cutting, drilling, and assembling beams into many different sizes and shapes of cranes and conveyor systems.

Crane and conveyor beams have been extruded of aluminum alloy material, which has the advantage of being easy to cut and drill and having a high strength-to-weight ratio, for simplifying assembly. H-shaped configurations have been used for extruded aluminum alloy beams for such crane and conveyor purposes; but I have found these to be wasteful of material, less than optimum in strength for the material used, and inconvenient for assembling and aligning into complete systems. I have improved on this by configuring a more efficient beam.

SUMMARY OF THE INVENTION

My cross-sectional configuration for a crane or conveyor beam extruded of an aluminum alloy is formed with extruded slots or grooves for receiving alignment dowel pins so that no weldments are necessary in the end regions of beams to be butt jointed. The dowel pin grooves are also located in thickened regions of the extrusion that are spaced as far as possible from a neutral axis of the beam, for adding strength and stability to the extrusion and for spacing alignment dowel pins at a widely separated and reliable stance. My beam otherwise forms a bottom channel with opposite side walls that turn inward toward an open bottom slot to provide a pair of parallel wheel tracks on opposite sides of the slot. A vertical web extends upward from the center of a top wall of the channel, and the vertical web is taller than the width of the channel. The vertical web terminates in a top flange that extends laterally of the vertical web and has thickened opposite edges. The dowel pin grooves are formed in the thickened opposite edges of the top flange, which thicken downwardly from a top plane and in opposite lower corners of the channel, where the channel side walls turn inward to form the wheel tracks.

The cost of an extruded aluminum alloy beam depends on the amount of aluminum used, and my beam configuration economizes on material by placing it in regions that contribute to strength and stability. Extruding the beam with alignment pin dowel slots saves the expense of welding alignment pin bushings to end regions of an extrusion when beams are assembled into a crane or conveyor system. This greatly simplifies butt joint assemblies, which can be accomplished with a simple clamp fastened to the vertical web of the beam.

DRAWINGS

FIGS. 1–3 are cross-sectional views of preferred embodiments of my beam, and FIG. 4 shows a partially assembled butt joint between end fragments of a pair of beams according to my invention.

DETAILED DESCRIPTION

Figure 3:
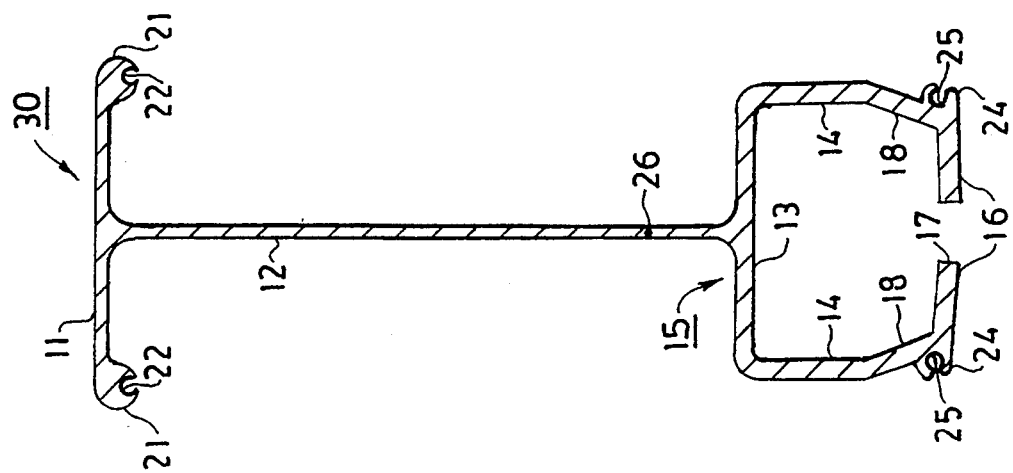
Figure 2:
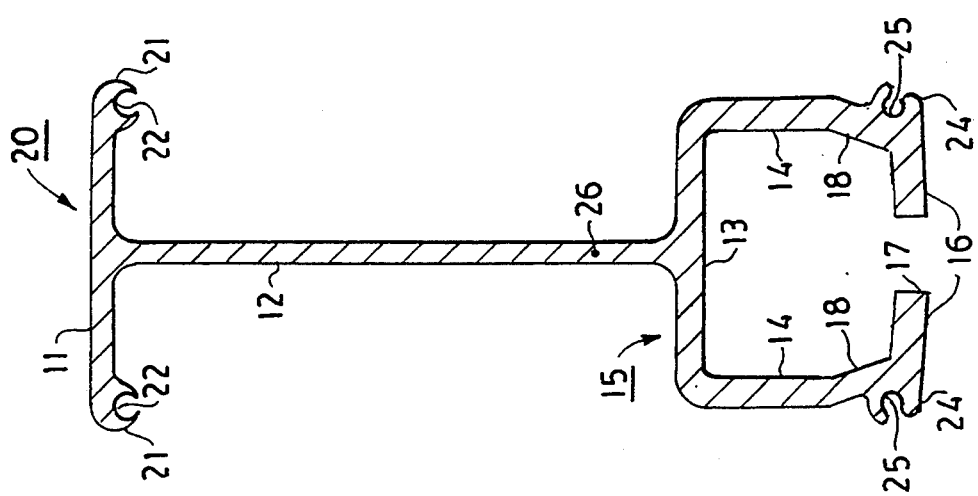
Figure 1:
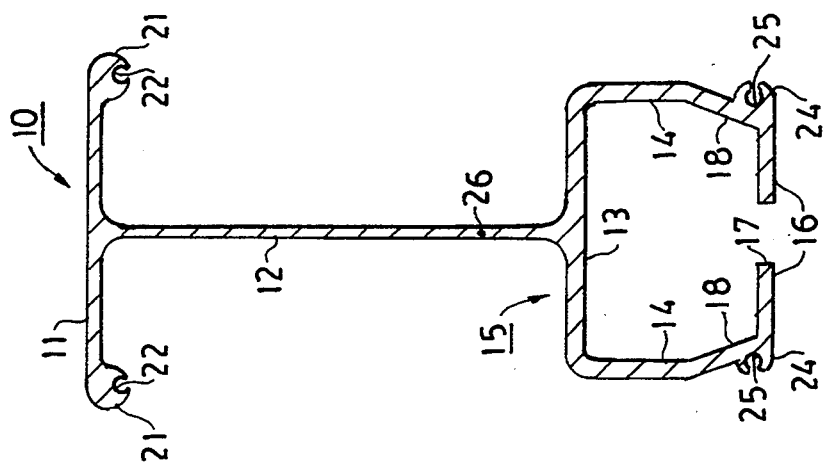

Beams 10, 20, and 30 of FIGS. 1, 2, and 3 are all similar in cross-sectional configuration and differ primarily in dimensions and proportions. They illustrate how beams can be configured according to my invention to support different loads. Beam 10 supports the lightest loads, beam 20 supports the heaviest loads, and beam 30 supports intermediate weight loads.

Each beam has a top flange 11, a vertical web 12, and a bottom channel 15. Each channel 15 has a top wall 13, a pair of opposed side walls 14, and inturned bottom or track walls 16 on opposite sides of a bottom slot 17. The wheels of elements such as trolleys and end trucks ride on the top surfaces of wheel tracks 16 on opposite sides of slot 17.

Vertical web 12 is taller than the width of channel 15, and top flange 11 extends laterally to about the width of channel 15. Top flange 11 is used for mounting or hanging the beam in place, and the beam load is carried by a wheeled element moving in channel 15.

A pair of thickened regions 21 are formed along opposite edges of top flange 11, and regions 21 are preferably thickened downward from the plane top of flange 11. Each of the thickened regions 21 is also preferably formed with an alignment pin groove or slot 22. Grooves 22 have narrow openings leading into wider interiors so that they can retain dowel alignment pins. These can have different shapes, but are preferably cylindrical so that the internal walls of grooves 22 are also preferably cylindrical, with slot openings narrower than the diameters of the cylindrically walled grooves.

Another pair of thickened regions 24 is formed at the lower or bottom corners of channel 15 where side walls 14 turn inward to form track walls 16. Another pair of dowel pin alignment grooves 25 are preferably formed in each thickened region 24, and grooves 25 also preferably have wider cylindrical interiors reached by narrower entrance slots.

Figure 4:
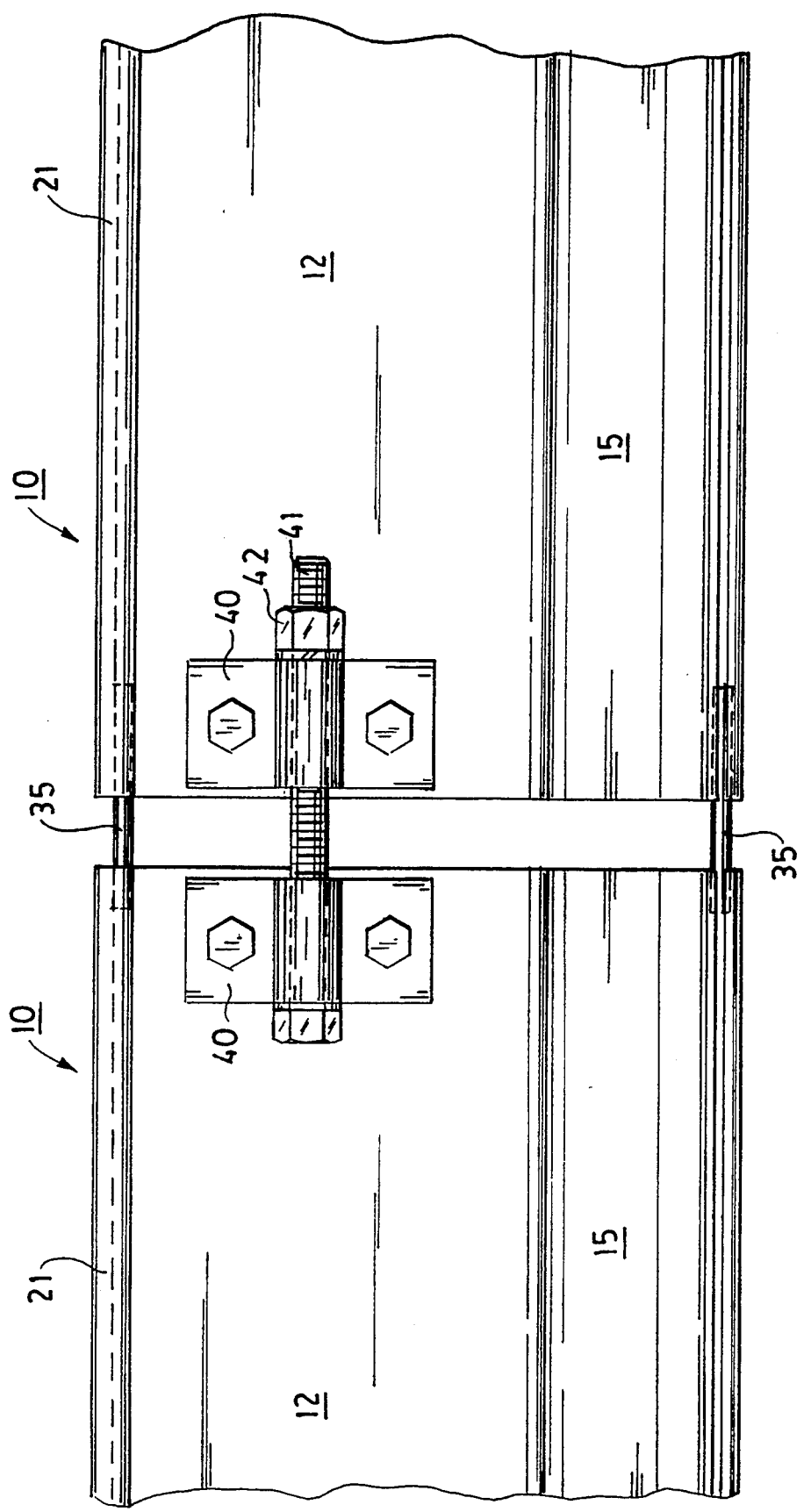

Each of the beams has a neutral axis 26, and thickened regions 21 and 24 are spaced as far as possible from neutral axis 26 to provide maximum strength and stability. This also spaces dowel pin alignment grooves 22 and 25 with a wide stance, at the four corners of the extrusion, where they can best stabilize the butt alignment of two beams, as shown in FIG. 4.

Dowel pins 35, which are preferably cylindrical rods or dowels cut a few inches long, can be pushed into the open ends of dowel pin alignment slots 22 and 25 at the end of a beam; and the beam containing the dowel pins can be brought into a butt joint alignment with another beam. Then, the dowel pins can be moved by tapping with a screwdriver blade extending into the pin grooves so that the dowel pins move into grooves in each beam and span the abutment joint, as shown in FIG. 4. Clamps 40 can be bolted or fastened to vertical webs 12 near the end of each beam to be joined, and a bolt 41 can extend through clamps 40 and also span the beam joint so that tightening nut 42 draws the ends of beams 10 snugly together from the somewhat separated position shown in FIG. 4. Clamps 40 and bolts 41 can be arranged on both sides of vertical webs 12, for even and balanced clamping of beam joints.

Lower portions 18 of channel side walls 14 can angle inward toward bottom track walls 16, as illustrated; and this can dispose thickened regions 24 within the overall width of channel 15. Other variations and configurational detail can also be selected for beams that are extruded according to my invention to maximize a strength-to-weight ratio and simplify the doweling and interconnecting of beam joints.

I claim:

1. A conveyor or crane beam comprising:
an aluminum alloy extrusion configured to form:
  a. a top flange having a plane top extending for the width of the beam;
  b. opposite side edges of the top flange being thickened so that the side edges are thicker than mid-regions of the top flange;
  c. a vertical web extending integrally from the top flange to a bottom flange that extends laterally to approximately the width of the top flange;
  d. opposite side edges of the bottom flange turning integrally downwardly to form channel side walls and integrally inwardly to form a channel bottom having a central bottom slot arranged so that the channel bottom provides a wheel track on each side of the bottom slot for supporting wheeled elements; and
  e. opposite bottom corners of the channel being thickened in a region where the channel side walls turn inwardly to the channel bottom so that the bottom corners are thicker than the channel side walls and the channel bottom.

2. The beam of claim 1 wherein the thickened extrusions regions of the top flange and the bottom corners are formed with pin slots for receiving dowel pins for aligning butt joints between adjacent beams.

3. The beam of claim 2 wherein walls of the pin slots are generally cylindrical for receiving cylindrical dowel pins, and the slots have openings that are narrower than the diameters of the slot walls.

4. The beam of claim 3 wherein the cylindrical walls of the pin slots all have the same diameter.

5. The beam of claim 2 arranged in butt jointed alignment with another beam so that four dowel pins arranged in the dowel slots hold the two beams in alignment.

6. The beam of claim 5 including clamps fastened to an axial end region of the vertical web for clamping together two beams that are aligned in a butt joint.

7. The beam of claim 1 wherein lower portions of channel side walls are inclined inward toward the bottom slot, and the thickened bottom corners of the channel are no wider than upper portions of the channel side walls.

8. The beam of claim 1 wherein the thickened side edges of the top flange are thickened downwardly below the plane top of the top flange.

9. An extruded aluminum alloy beam having wheel tracks arranged on opposite sides of a bottom slot in a channel for carrying wheeled elements, the beam comprising:
  a. a vertical web extending integrally upward from the top center of the channel for a distance of more than the width of the channel;
  b. a top flange extending laterally across the top of the vertical web to about the width of the channel; and
  c. thickened regions of the extrusion being formed along opposite side edges of the top flange and along opposite lower corners of the channel where the thickened regions are spaced as far as possible from a neutral axis of the beam.

10. The beam of claim 9 including grooves formed in the thickened region to receive beam alignment dowel pins.

11. The beam of claim 10 wherein openings to the grooves are narrower than internal widths of the grooves.

12. The beam of claim 9 including a clamp bolted to an end region of the vertical web for clamping a pair of beams into an aligned butt joint.

13. The beam of claim 9 wherein thickened lower corners of the channel and thickened edge regions of the top flange are thicker than wall regions formed elsewhere in the beam.

14. A crane or conveyor beam comprising:
the beam being extruded of an aluminum alloy and configured to form:
  a. an integral channel having an upper wall and a pair of opposed side walls, the side walls turning inward and terminating along an open bottom slot to provide parallel wheel tracks on opposite sides of the slot;
  b. the walls of the channel having thickened regions along opposite lower corners where the side walls turn inward to form the wheel tracks;
  c. a vertical web extending integrally upward from a central region of the upper wall of the channel, the vertical web being taller than the width of the channel;
  d. the vertical web terminating in an integral top flange extending laterally of the vertical web to about the width of the channel; and
  e. the top flange having a plane top and thickened opposite edge regions turning downward from the plane top.

15. The beam of claim 14 including dowel pin grooves formed in the thickened regions of the channel and the thickened edge regions of the top flange to receive beam alignment dowel pins.

16. The beam of claim 15 wherein openings to the grooves are narrower than internal widths of the grooves.

17. The beam of claim 14 wherein lower portions of the side walls of the channel incline inward above the opposite lower corners, and the thickened corner regions are no wider than upper portions of the channel side walls.

18. The beam of claim 14 wherein the thickened lower corner regions of the channel and the thickened edge regions of the top flange are thicker than wall regions formed elsewhere in the beam.

19. The beam of claim 14 wherein inside surfaces of the side walls of the channel incline outward above the wheel tracks.

* * * * *